United States Patent [19]
Hashimoto et al.

[11] Patent Number: 5,831,760
[45] Date of Patent: Nov. 3, 1998

[54] ELECTROCHROMIC DEVICE

[75] Inventors: Shigeru Hashimoto, Yokohama; Junji Terada, Hiratsuka, both of Japan

[73] Assignee: Canon Kabushiki Kaisha, Tokyo, Japan

[21] Appl. No.: 608,596

[22] Filed: Mar. 1, 1996

[30] Foreign Application Priority Data

| Mar. 3, 1995 | [JP] | Japan | 7-068892 |
| Mar. 3, 1995 | [JP] | Japan | 7-068893 |
| Sep. 29, 1995 | [JP] | Japan | 7-275052 |
| Feb. 26, 1996 | [JP] | Japan | 8-061619 |

[51] Int. Cl.$^6$ ........................ G02F 1/153
[52] U.S. Cl. ............... 359/273; 359/274; 359/275
[58] Field of Search .................. 359/270, 273, 359/274, 275

[56] References Cited

U.S. PATENT DOCUMENTS

| 4,294,520 | 10/1981 | Inoue et al. | 350/357 |
| 4,350,414 | 9/1982 | Takahashi et al. | 350/357 |
| 4,652,090 | 3/1987 | Uchikawa et al. | 350/357 |
| 5,011,582 | 4/1991 | Oshikawa et al. | 204/140 |

FOREIGN PATENT DOCUMENTS

| 0448260 | 9/1991 | European Pat. Off. | B60R 1/08 |
| 2625573 | 7/1989 | France | G02F 1/23 |
| 60-31355 | 7/1985 | Japan | C09K 9/00 |
| 5-33373 | 5/1993 | Japan | G02F 1/15 |
| 5-58171 | 8/1993 | Japan | G02F 1/15 |
| 6-27499 | 2/1994 | Japan | G02F 1/15 |

OTHER PUBLICATIONS

Patent Abstracts of Japan, vol. 008, No. 165 (P–291), Jul. 31, 1984 & JP-A-59 061820 (Canon KK), Apr. 9, 1984.
Patent Abstracts of Japan, vol. 009, No. 125 (C0283), May 30, 1085 & JP-A-60 011577 (Fujitsu KK), Jan. 21, 1985.
Patent Abstracts of Japan, vol. 018, No. 362 (P–1766), Jul. 7, 1994 & JP-A-06 095172 (Toyota Motor Corp.), Apr. 8, 1994.
Patent Abstracts of Japan, vol. 013, No. 125 (P–847), Mar. 28, 1989 & JP-A-63 294536 (Nikon Corp), Dec. 1, 1988.
Patent Abstracts of Japan, vol. 016, No. 355 (P–1394), Jul. 30, 1992 & JP-A-04 107427 (Nikon Corp), Apr. 8, 1992.

*Primary Examiner*—Georgia Y. Epps
*Assistant Examiner*—Dawn-Marie Bey
*Attorney, Agent, or Firm*—Fitzpatrick, Cella, Harper & Scinto

[57] ABSTRACT

An electrochromic device and a method for manufacturing the same, which device at least comprises a pair of opposed transparent substrates provided with a pair of opposed transparent electrodes therebetween; and an oxidative coloring electrochromic layer, a layer comprising an oxidative coloring electrochromic material and a metal oxide, a transparent ion conductive layer, and a reductive coloring electrochromic layer provided between the pair of transparent electrodes. Thereby, an electrochromic device can be provided, which device exhibits high optical transmittance during discoloring and shows excellent response speed and repeated-durability when being driven at high contrast ratio.

46 Claims, 6 Drawing Sheets

ELECTROCHROMIC DEVICE

BACKGROUND OF THE INVENTION

1. Field Of The Invention

The present invention relates to an electrochromic device and a method for manufacturing the same, which device is used for a display device, a transmittance-variable filter, etc.

2. Description Of The Related Art

Application of an electrochromic device (EC device) colored or discolored (approximately transparent) corresponding to an applied electrical field to a display device, a transmittance-variable filter, etc. has been investigated because the EC device, compared with ordinary liquid crystal devices and the like, has high optical transmittance at a discolored state, is unaffected by polarization, and exhibits a memory effect.

FIG. 6 shows a complementary type EC device which is a known example of the aforementioned EC device and is described in Japanese Patent Publication No. 60-31355, U.S. Pat. No. 4,350,414, etc. Five layers are provided on a transparent substrate 101 of the device in such a way that a reductive coloring electrochromic layer 105 composed of tungsten oxide and/or molybdenum oxide, an insulating film 104 made of tantalum pentoxide, and an oxidative coloring electrochromic layer 103 substantially composed of iridium hydroxide and/or nickel hydroxide are provided between a pair of electrode layers 102a and 102b.

In addition, another complementary type EC device having five layers is disclosed in Japanese Patent Publication No. 5-33373, U.S. Pat. No. 4,652,090, etc. The device has a transparent dispersion layer which comprises a metal iridium, iridium oxide, or iridium hydroxide disperse phase and a transparent solid dispersion medium as the aforedescribed oxidative coloring electrochromic layer 103.

Further, Japanese Patent Publication No. 5-58171 and Japanese Laid-Open Patent Application No. 6-27499 disclose methods for manufacturing devices having the above transparent disperse phase.

However, any of the above devices exhibits slow response speed (coloring or discoloring speed) when being driven under such a condition that the contrast ratio (optical transmittance during discoloring/optical transmittance during coloring) is 10 or more.

To increase the coloring speed, it is required to increase the thickness of the reductive coloring electrochromic layer and the oxidative coloring electrochromic layer. In the EC devices described in U.S. Pat. No. 4,350,414, etc., however, optical transmittance of those layers decreases with an increase in the thickness of the oxidative coloring electrochromic layer which has high absorbance. In other words, when the thickness of the oxidative coloring electrochromic layer is 50 nm or more, it is impossible to increase the mean transmittance at a wavelength band of 400 to 700 nm to more than 75% because of an increase in the absorbance. The absorbance increases particularly at the shorter wavelength band of less than 500 nm. Meanwhile, the repeated durability and the coloring speed decreases in correspondence with the decrease in thickness of the layer. In other words, the electrode is reduced while repeating coloring and discoloring, resulting in an increase in the absorbance. Moreover, in the EC device described in U.S. Pat. No. 4,652,090, etc., the absorbance increases when the thickness of the transparent dispersion layer, i.e., the oxidative coloring electrochromic layer, increases. Further, when the transparent dispersion layer is used as the oxidative coloring electrochromic layer, sufficient repeated durability cannot be obtained even if the layer becomes thicker, that means the absorbance increases by the reduction of the electrode.

In addition, in the EC device described in U.S. Pat. No. 4,652,090, the transparent dispersion layer is deposited by reactive ion plating, resulting in an unstable deposition rate and impaired reproducibility of the mixture ratio of the disperse phase to the transparent dispersion medium. Therefore, a reliable production of EC devices exhibiting excellent properties has not yet been realized.

Additionally, the transparent dispersion layers prepared by the method disclosed in Japanese Patent Publication No. 5-58171 and Japanese Laid-Open Patent Application No. 6-27499 do not exhibit sufficient optical transmittance when applied to EC devices.

SUMMARY OF THE INVENTION

An object of the present invention is to provide an EC device and a method for manufacturing the same, which device exhibits high optical transmittance during discoloring and shows an excellent response speed and repeated durability when being driven at a high contrast ratio. A further object of the present invention is to provide a reliable method for manufacturing an EC device having excellent properties.

According to the present invention, there is provided an electrochromic device at least having a pair of opposed transparent electrodes, an oxidative coloring electrochromic layer, a layer comprising an oxidative coloring electrochromic material and a metal oxide, a transparent ion conductive layer, a reductive coloring electrochromic layer, and the layers being provided between the pair of opposed transparent electrodes.

The present invention further provides an electrochromic device at least having a pair of opposed transparent electrodes, an oxidative coloring electrochromic layer, a layer comprising an oxidative coloring electrochromic material and a metal oxide, a transparent ion conductive layer, and a reductive coloring electrochromic layer, wherein the oxidative coloring electrochromic layer, the layer comprising an oxidative coloring electrochromic material and a metal oxide, the transparent ion conductive layer, and the reductive coloring electrochromic layer are successively provided one over the other between the pair of opposed transparent electrodes.

The present invention still further provides an electrochromic device at least having a pair of opposed transparent substrates provided with a pair of opposed transparent electrodes therebetween, and an oxidative coloring electrochromic layer, a layer comprising an oxidative coloring electrochromic material and a metal oxide, a transparent ion conductive layer, and a reductive coloring electrochromic layer provided between the pair of transparent electrodes, wherein at least the oxidative coloring electrochromic layer, the layer comprising an oxidative coloring electrochromic material and a metal oxide, the transparent ion conductive layer, and the reductive coloring electrochromic layer are encapsulated by a resin.

The present invention further provides an electrochromic device at least having a pair of opposed transparent substrates provided with a pair of opposed transparent electrodes therebetween, and an oxidative coloring electrochromic layer, a layer comprising an oxidative coloring electrochromic material and a metal oxide, a transparent ion conductive layer, and a reductive coloring electrochromic layer provided between the pair of transparent electrodes, wherein the oxidative coloring electrochromic layer, the layer comprising an oxidative coloring electrochromic material and a metal oxide, the transparent ion conductive layer, and the reductive coloring electrochromic layer are successively provided one over the other between the pair of opposed transparent electrodes; and at least the oxidative coloring electrochromic layer, the layer comprising an oxidative coloring electrochromic material and a metal oxide, the transparent ion conductive layer, and the reductive coloring electrochromic layer are encapsulated by a resin.

The present invention still further provides an electrochromic device at least having a first layer comprising indium tin oxide; a second layer comprising at least one selected from the group of metals consisting of Co, Ni, Fe, Ir, Cu, Ru, Rh, Pd, Re, Os, Pt, Ho, Sm, Cr, Dy, and Er, oxides of the metals, hydroxides of the metals, oxyhydroxides of the metals, and mixtures thereof; a third layer comprising at least one compound selected from the group consisting of $TiO_2$, $Ta_2O_5$, $ZrO_2$, $HfO_2$, $Y_2O_3$, $Al_2O_3$, $SiO_2$, and $SnO_2$, and at least one selected from the group of metals consisting of Co, Ni, Fe, Ir, Cu, Ru, Rh, Pd, Re, Os, Pt, Ho, Sm, Cr, Dy, and Er, oxides of the metals, hydroxides of the metals, oxyhydroxides of the metals, and mixtures thereof; a fourth layer comprising at least one selected from the group consisting of $Ta_2O_5$, $ZrO_2$, $SiO_2$, and $MgF_2$; a fifth layer comprising at least one selected from the group consisting of $WO_3$, $MoO_3$, and $Nb_2O_5$; and a sixth layer comprising indium tin oxide.

In addition, the present invention provides a method for manufacturing an electrochromic device, the device at least having a pair of opposed transparent substrates provided with a pair of opposed transparent electrodes therebetween, and an oxidative coloring electrochromic layer, a layer comprising an oxidative coloring electrochromic material and a metal oxide, a transparent ion conductive layer, and a reductive coloring electrochromic layer provided between the pair of transparent electrodes, the method having a step of depositing the layer comprising an oxidative coloring electrochromic material and a metal oxide on one of the oxidative coloring electrochromic layer and the transparent ion conductive layer by sputtering in an atmosphere selected from the group consisting of water vapor, oxygen, a mixture of water vapor and oxygen, and a mixture of water vapor and argon; and a step of forming the rest of the oxidative coloring electrochromic layer and the transparent ion conductive layer thereon.

DESCRIPTION OF THE PREFERRED EMBODIMENTS

Further objects, features and advantages of the present invention will become apparent from the following description of the preferred embodiments with reference to the attached drawings.

First, embodiment 1 will be explained taken in conjunction with FIG. 1.

Figure 1:
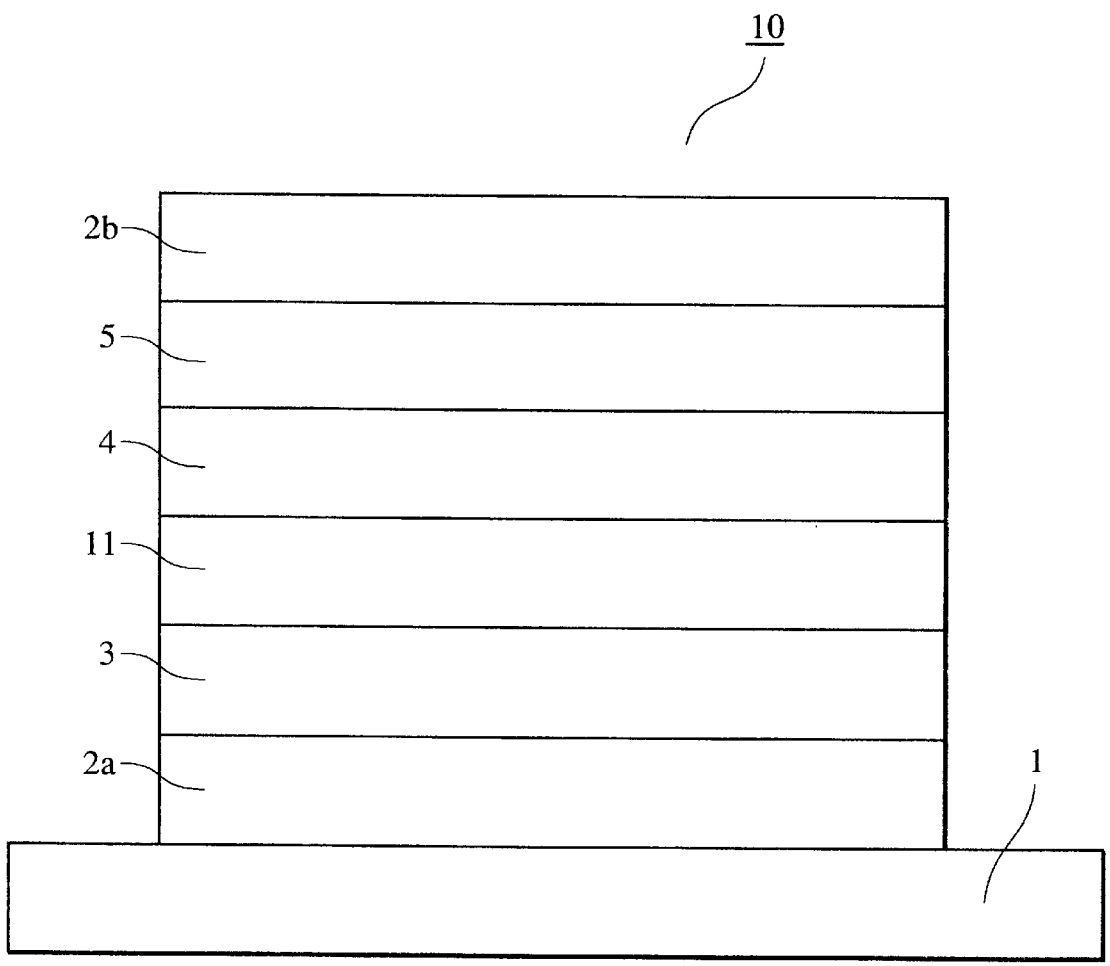
FIG. 1 is a schematic sectional diagram showing a layer structure of an electrochromic device in embodiment 1 according to the present invention.

Referring now to FIG. 1, there is shown a layer structure of an EC device 10 used in embodiment 1 of the present invention. A transparent substrate 1 of the EC device 10 is provided with a transparent electrode layer 2a, an oxidative coloring electrochromic layer 3, a layer 11 (referred as to a mixture layer hereinafter) composed of a mixture of an oxidative coloring electrochromic material and a metal oxide, a transparent ion conductive layer 4, a reductive coloring electrochromic layer 5, and a transparent electrode layer 2b thereon in that order. That is, the EC device 10 employs a six-layer structure instead of the five-layer structure applied to conventional EC devices.

Although the transparent substrate 1 is preferably formed of glass, various transparent materials such as plastic may be employed depending on the use of the EC device. In addition, an anti-reflection coating (ARC) is preferably provided on a surface, reverse to the transparent electrode layer, of the transparent substrate 1 by forming a monolayer of a dielectric material including $Al_2O_3$, $TiO_2$, and $MgF_2$, or multi-layers composed of a plurality of different kinds of monolayers.

Such materials as $In_2O_3$, $SnO_2$, and ITO (indium tin oxide) can be used for transparent electrode layers 2a and 2b. Considering an optical property, i.e., optical transmittance, electric resistance and others, ITO is preferable among them, and ITO in which the ratio of $In_2O_3$ to $SnO_2$ is approximately 95:5 is more preferable.

The oxidative coloring electrochromic layer 3 preferably contains at least one element selected from the group consisting of Co, Ni, Fe, Ir, Cu, Ru, Rh, Pd, Re, Os, Pt, Ho, Sm, Cr, Dy, and Er. The element exists as a simple body (M), an oxide ($MO_x$), a hydroxide ($M(OH)_x$), an oxyhydroxide ($MO_x(OH)_y$), or a mixture thereof. Taking into consideration optical properties and repeated durability, the oxidative coloring electrochromic layer 3 is more preferably composed of iridium, iridium oxide, iridium hydroxide, iridium oxyhydroxide, cobalt, cobalt oxide, cobalt hydroxide, cobalt oxyhydroxide, nickel, nickel oxide, nickel hydroxide, nickel oxyhydroxide, or a mixture thereof.

The preferable thickness range of the oxidative coloring electrochromic layer 3 is from 1 nm to 50 nm. The repeated durability decreases if the thickness is under 1 nm, and the absorbance increases when the thickness is above 50 nm.

The transparent ion conductive layer 4 is preferably composed of $Ta_2O_5$, $ZrO_2$, $SiO_2$, $MgF_2$, or a mixture thereof. Considering optical properties and repeated durability, $Ta_2O_5$ is more preferable among them.

The reductive coloring electrochromic layer 5 is preferably composed of $WO_3$, $MoO_3$, $Nb_2O_5$, or a mixture thereof. Considering the coloring speed, $WO_3$ is more preferable among them. In addition, the layer 5 composed of a mixture of $WO_3$ and $MoO_3$ can show a black color in the coloring state.

The oxidative coloring electrochromic material used for the mixture layer 11 preferably contains at least one element selected from the group consisting of Co, Ni, Fe, Ir, Cu, Ru, Rh, Pd, Re, Os, Pt, Ho, Sm, Cr, Dy, and Er. The element exists as a simple body (M), an oxide ($MO_x$), a hydroxide ($M(OH)_x$), an oxyhydroxide ($MO_x(OH)_y$), or a mixture thereof. Taking into consideration optical properties and repeated durability, the oxidative coloring electrochromic material is more preferably iridium, iridium oxide, iridium hydroxide, iridium oxyhydroxide, cobalt, cobalt oxide, cobalt hydroxide, cobalt oxyhydroxide, nickel, nickel oxide, nickel hydroxide, nickel oxyhydroxide, or a mixture thereof.

Metal oxide having high optical transmittance is preferably used for the mixture layer 11. Further, it is preferred that such metal oxide does not exhibit electrochromism, particularly reductive coloring electrochromizm when a common voltage is applied thereto. Practically, the metal oxide is preferably selected from the group consisting of $TiO_2$, $Ta_2O_5$, $ZrO_2$, $HfO_2$, $Y_2O_3$, $Al_2O_3$, $SiO_2$, $SnO_2$, or a mixture thereof.

The weight ratio of an oxidative coloring electrochromic material to a metal oxide is preferably $0.02 \leq$ (oxidative coloring electrochromic material/metal oxide)$\leq 1$. The absorbance increases if the weight ratio is above 1, and the durability and the coloring speed (response speed) decrease when the ratio is under 0.02.

The preferable thickness of the mixture layer 11 is in a range of from 10 nm to 5,000 nm, considering the response speed and the optical transmittance. The absorbance increases if the thickness of the layer exceeds 5,000 nm, and both the durability and the coloring speed (response speed) decrease when the thickness of the layer is under 10 nm.

The preferable thickness of other layers, except the oxidative coloring electrochromic layer 3 and the mixture layer 11, is in a range of from 1 nm to 5,000 nm, depending on the required optical transmittance, repeated durability, and the like.

While the EC device 10 of embodiment 1 has the transparent substrate 1 provided with the transparent electrode layer 2a, the oxidative coloring electrochromic layer 3, the mixture layer 11, the transparent ion conductive layer 4, the reductive coloring electrochromic layer 5, and the transparent electrode layer 2b thereon in that order, those layers may be piled up in the reverse order, i.e., the transparent electrode layer, the reductive coloring electrochromic layer, the transparent ion conductive layer, the mixture layer, the oxidative coloring electrochromic layer, and the transparent electrode layer.

A method for manufacturing the EC device 10 of this embodiment will be described as follows.

First, the transparent electrode layer 2a is prepared on the transparent substrate 1 by any known deposition process, such as vacuum evaporation, sputtering, ion plating, and CVD.

Then, the oxidative coloring electrochromic layer 3 is formed on the transparent electrode layer 2a by any known deposition process, such as vacuum evaporation, sputtering, ion plating, and CVD.

Subsequently, the mixture layer 11 is prepared on the oxidative coloring electrochromic layer 3, desirably, by sputtering in an atmosphere of water vapor, oxygen, a mixture thereof, or a mixture of water vapor and argon. It is preferred that sputtering proceeds in an atmosphere of water vapor, a mixture of water vapor and oxygen, or a mixture of water vapor and argon, and more preferably, in an atmosphere of water vapor, or a mixture of water vapor and argon in a gas pressure range of 1 Pa to 20 Pa with a mixture ratio (flow ratio) of water vapor to argon of 0.5 or more. When the sputtering proceeds in an atmosphere of water vapor or a mixture of water vapor and argon at a mixture ratio (flow ratio) of above 20, the gas pressure is preferably 10 Pa or less. If the mixture ratio (flow ratio) of water vapor to argon ranges from 0.5 to 20, the gas pressure is preferably 20 Pa or less. A gas pressure larger than the aforementioned values results in a slower deposition speed, which impairs productivity, and a harmful influence on the vacuum pump, e.g., cryo-pump and diffusion pump, of the evacuation system. When the mixture ratio (flow ratio) of water vapor to argon is under 0.5, the absorbance of the mixture layer 11 increases. Further, stable discharge cannot be obtained if the gas pressure is under 1 Pa. A more preferable sputtering condition is such that a gas pressure is in a range of from 1 Pa to 10 Pa and a mixture ratio (flow ratio) of water vapor to argon is in a range of from 0.5 to 20.

Then, the transparent ion conductive layer 4, the reductive coloring electrochromic layer 5, and the transparent electrode layer 2b are prepared in that order by the above-mentioned known deposition techniques so as to produce the EC device 10.

Figure 2:
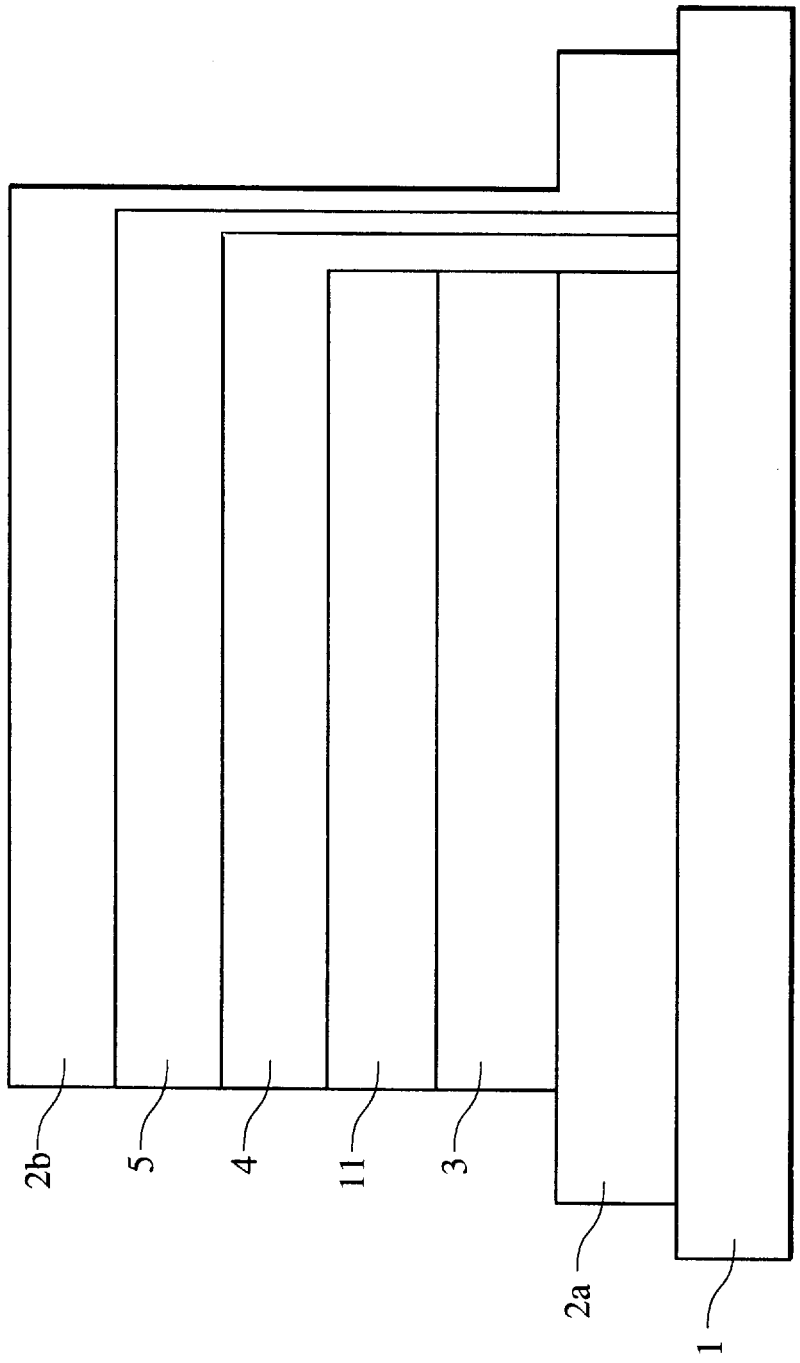
FIG. 2 is a schematic sectional diagram showing a modified example of an electrochromic device in embodiment 1 according to the present invention.

An EC device 20 shown in FIG. 2 is a modified example of the EC device 10 of this embodiment and will be explained in the following.

As is shown in FIG. 2, one lateral side, which means the left side in the figure, of a transparent electrode layer 2a is extended outward compared with the other layers. The extended portion is utilized for connecting. The opposite lateral side, which means the right side in FIG. 2, of a transparent electrode 2b is extended to a substrate 1 along the lateral surfaces of layers 5, 4, 11, 3, and 2a so as to form a connecting portion on the substrate 1. In the EC device 20, it is necessary to prevent electrons from moving between the transparent electrode 2b and other layers 11, 3, and 2a. For this purpose, e.g., the lateral side of the transparent ion conductive layer 4 is extended to the substrate 1 along lateral surfaces of the layers 11, 3, and 2a. Although the lateral side of the reductive coloring electrochromic layer 5 is similarly extended to the substrate 1 in FIG. 2, it is not always needed.

The afore-described arrangement of the EC device 20 is provided by shifting the mask position in the steps for preparing layers 2a, 3, 5, and 2b, for example, in sputtering.

Figure 3:
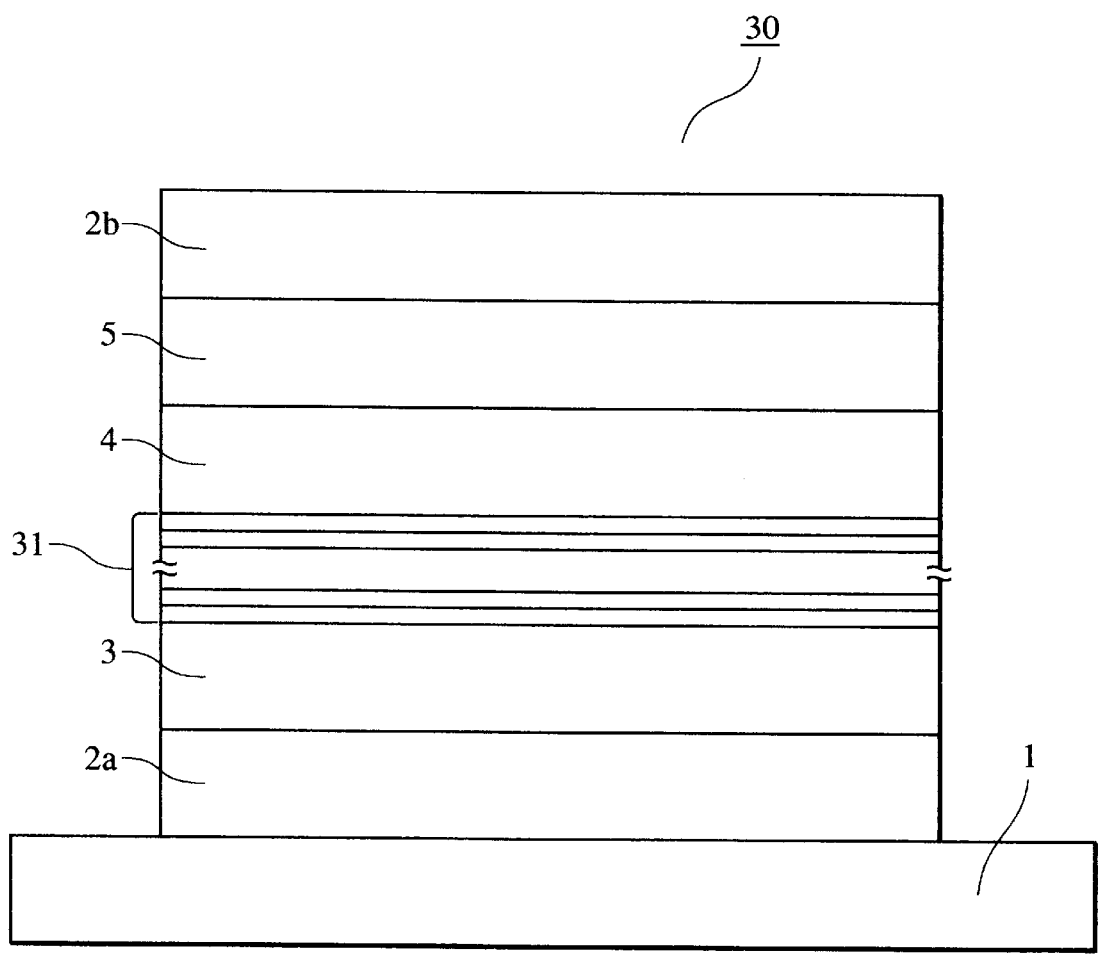
FIG. 3 is a schematic sectional diagram showing a layer structure of an electrochromic device of embodiment 2 according to the present invention.

Following is the description of embodiment 2 according to the present invention with reference to FIG. 3, wherein the same numerals as shown in FIG. 1 identify identical parts.

FIG. 3 is a schematic sectional diagram showing a layer structure of an EC device 30 used in embodiment 2 of the present invention. A transparent substrate 1 of the EC device 30 is provided with a transparent electrode layer 2a, an oxidative coloring electrochromic layer 3, a layer 31 (referred as to an alternate layer hereinafter) formed such that at least one oxidative coloring electrochromic material layer and at least one metal oxide layer are alternately piled, a transparent ion conductive layer 4, a reductive coloring electrochromic layer 5, and a transparent electrode layer 2b thereon in that order. That is, the EC device 30 employs a six-layer structure instead of the five-layer structure applied to conventional EC devices.

Those layers of the EC device 30 may be piled up in the reverse order, i.e., the transparent electrode layer, the reductive coloring electrochromic layer, the transparent ion conductive layer, the alternate layer, the oxidative coloring electrochromic layer, and the transparent electrode layer.

The alternate layer 31 is prepared by alternately piling at least one sublayer comprising an oxidative coloring electrochromic material and at least one sublayer comprising metal oxide.

Considering the response speed and optical transmittance, the thickness of the oxidative coloring electrochromic material sublayer is preferably 0.01 to 1 times that of the metal oxide sublayer. The preferable thickness is in a range of 0.1 nm (monomolecular layer) to 1 nm for each of the sublayers composing the alternate layer, and 1 nm to 5,000 nm for the alternate layer as a whole, depending on the required optical transmittance and repeated durability.

The afore-mentioned oxidative coloring electrochromic materials and metal oxides used for the mixture layer 11 of the EC device 10 are also preferably used for the alternate layer 31.

Other layers are similar to those used for the EC device 10.

Returning now to a method for manufacturing the EC device 30 of this embodiment, the process for preparing the alternate layer 31 will be explained, since other layers can be formed by a known deposition technique in the same manner as the EC device 10.

The alternate layer 31 is preferably prepared by sputtering in a atmosphere similar to embodiment 1. A target for forming a sublayer of an oxidative coloring electrochromic material and a target for forming a sublayer of a metal oxide are provided with corresponding shutters, respectively. The shutters are arranged to alternately open or close so as to determined the thickness of each sublayer.

It is also possible to modify the EC device 30 in a way similar to the EC device 20.

In the foregoing embodiments, each layer may contain some impurities unless the function of the layer is impaired.

Figure 4:
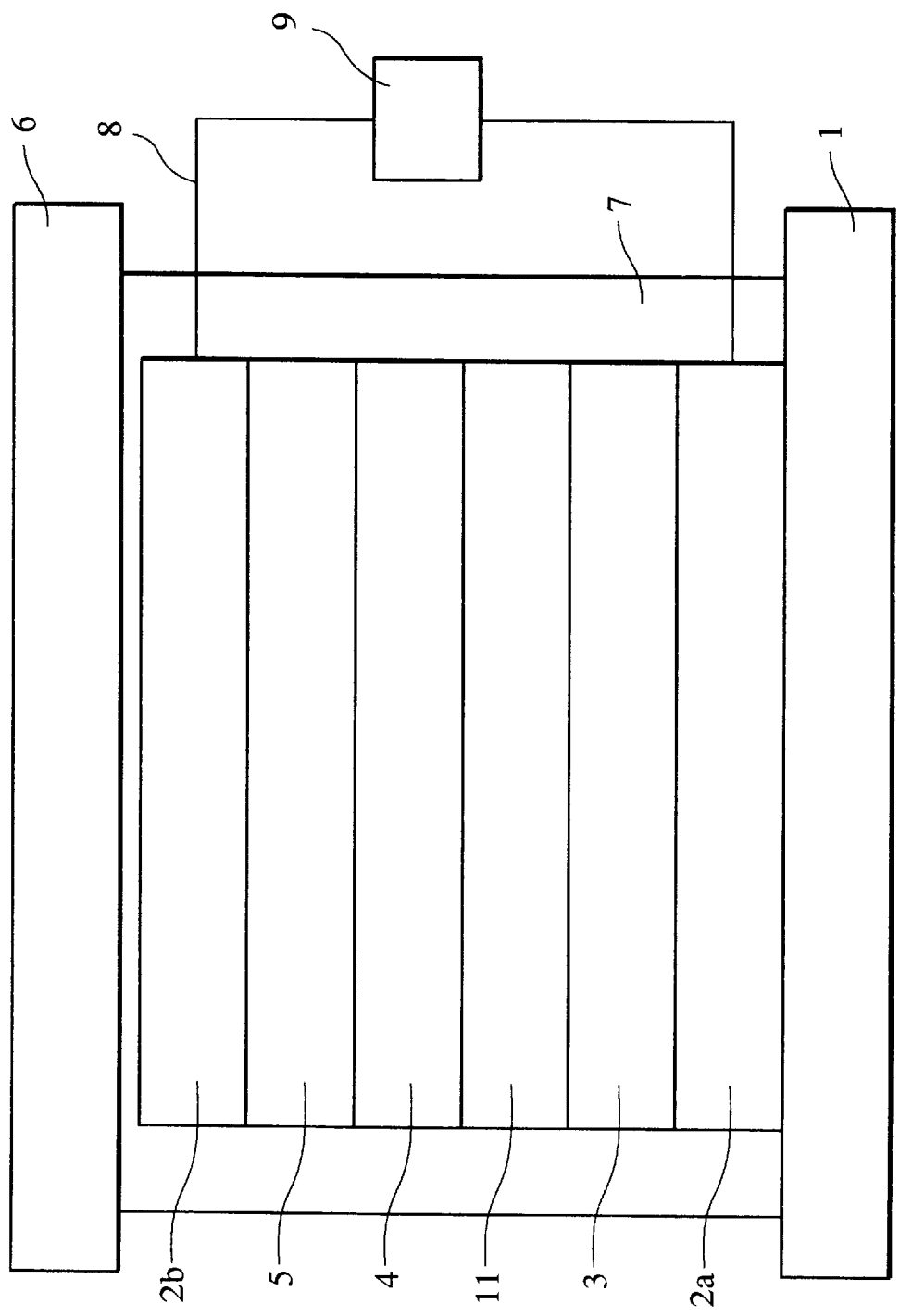
FIG. 4 is a schematic sectional diagram showing a packaged electrochromic device in embodiment 1 according to the present invention.

The EC device shown in the above embodiments is used after being packaged. FIG. 4 illustrates a schematic sectional diagram of the packaged EC device 10 of embodiment 1.

Transparent electrodes 2a and 2b of the EC device 10 connect to a power source 9 through a wire 8. The space between a transparent substrate 6 and the transparent electrode 2b opposed mutually and the periphery of the layers provided between the transparent substrates 1 and 6 are encapsulated with a transparent resin 7. In other words, the EC device 10 is encapsulated by the resin. The resin 7 serves to adhere the transparent substrates 1 and 6, as well as to prevent the oxidative coloring electrochromic layer 3, the mixture layer 11, the transparent ion conductive layer 4, and the reductive coloring electrochromic layer 5 from being exposed to the outside air. Connecting portions of the transparent electrodes 2a and 2b may be exposed to the outside air. The transparent substrate 6 is similar to the above-mentioned transparent substrate 1, and preferably provided with an ARC on the surface reverse to the transparent electrode 2b.

Figure 5:
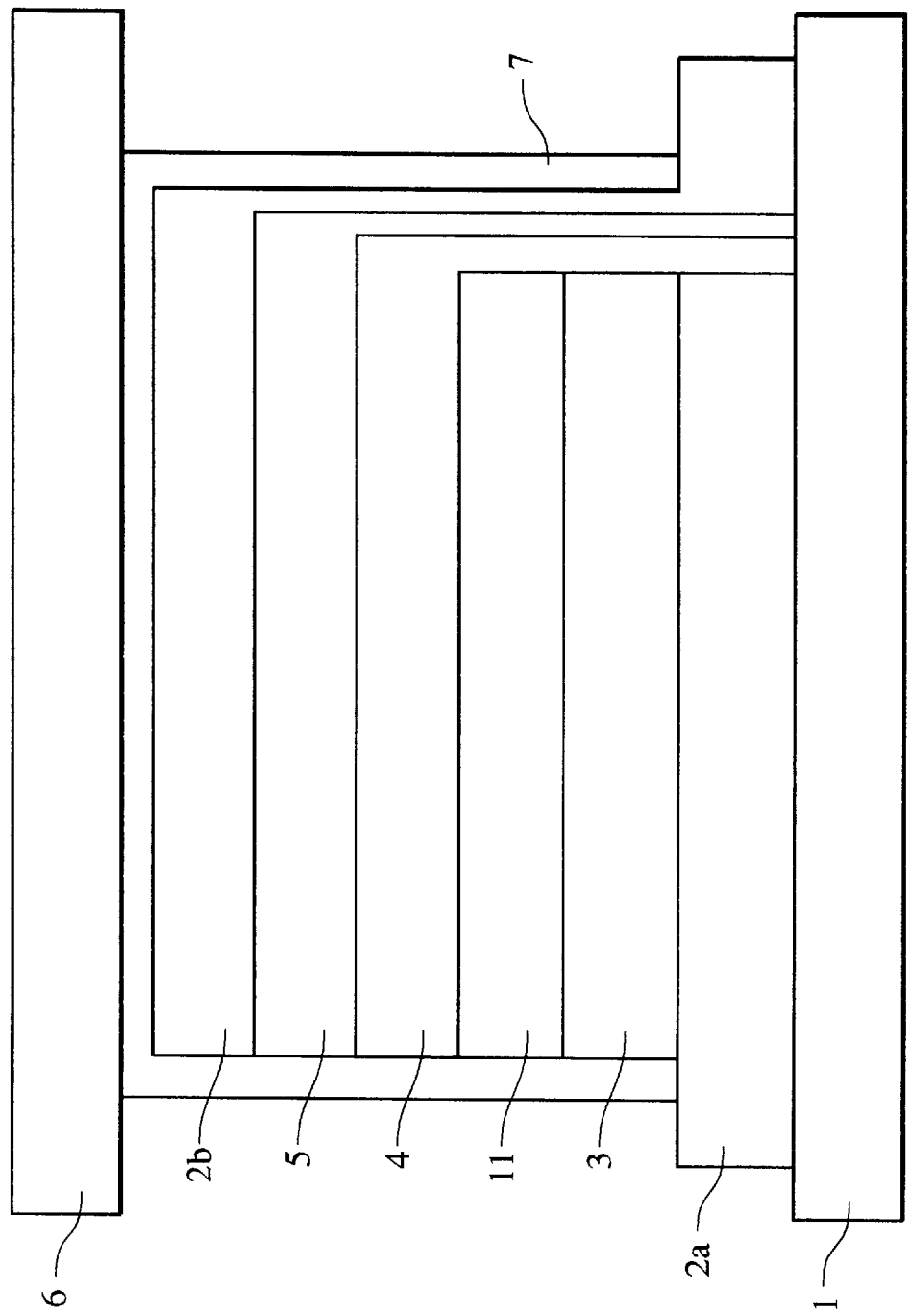
FIG. 5 is a schematic sectional diagram showing a modified example of a packaged electrochromic device of embodiment 1 according to the present invention.
Figure 6:
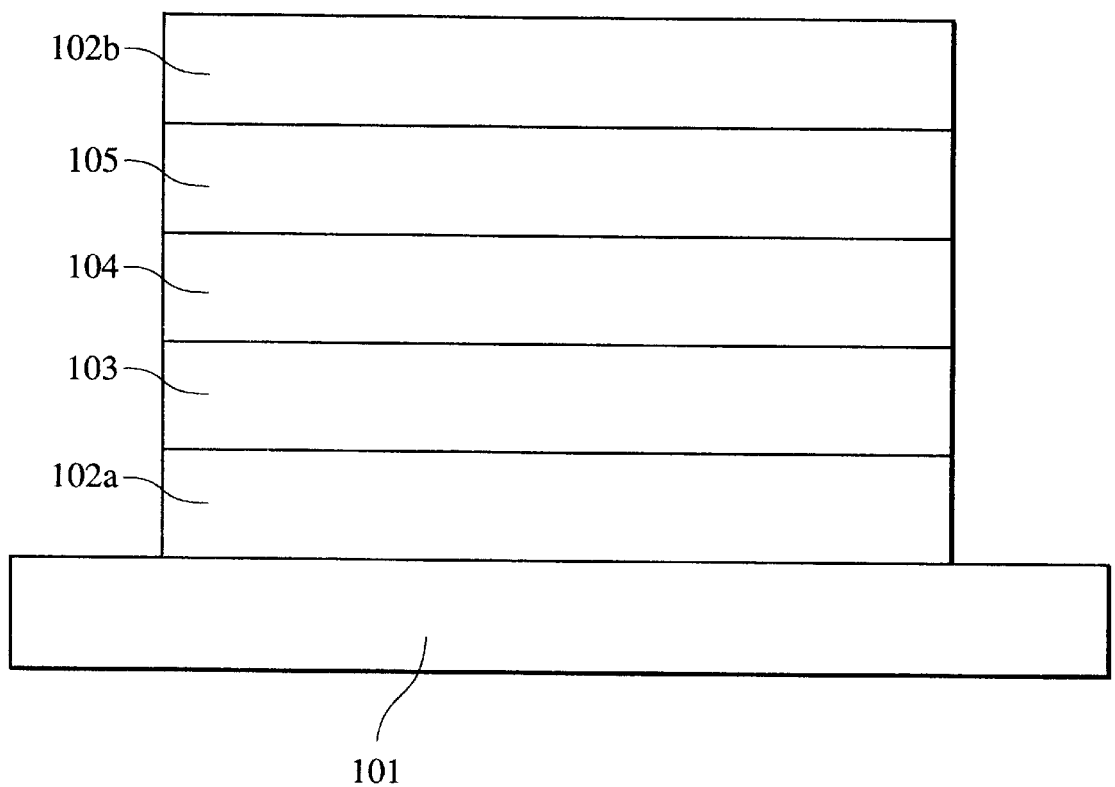
FIG. 6 is a schematic sectional diagram showing a layer structure of a conventional electrochromic device composed of five layers.

FIG. 5 illustrates a schematic sectional diagram of the packaged EC device 20, wherein wires and power source are not shown.

Except the connecting portions of the transparent electrodes 2a and 2b, which portions allow given wiring, each layer of the EC device 20 is encapsulated by a resin, as shown in FIG. 5.

Examples and comparative examples will be described as follows.

Example 1

On a transparent glass substrate having its reverse surface provided with an ARC, ITO was vacuum-evaporated at a substrate temperature of 300° C. and at an $O_2$ partial pressure of $5 \times 10^{-2}$ Pa, thereby a transparent conductive layer 150 nm thick was formed as the first layer.

Then, deposition on the transparent conductive layer proceeded by radio-frequency sputtering using cobalt metal as a target under conditions such that the substrate was at room temperature, the mixture gas pressure of water vapor and argon was 5 Pa, and the flow ratio of water vapor to argon was 3; thereby an oxidative coloring electrochromic layer 5 nm thick was formed as the second layer. Power of 500 W was input to the cobalt metal target.

The oxidative coloring electrochromic layer mainly contains cobalt oxide and cobalt hydroxide, and also contains cobalt metal, etc.

As the third layer, a mixture layer 400 nm thick comprising an oxidative coloring electrochromic material and a metal oxide was deposited on the oxidative coloring electrochromic layer by radio-frequency co-sputtering using cobalt metal and tin metal as targets under conditions such that the substrate was at room temperature, the mixture gas pressure of water vapor and argon was 5 Pa, and the flow ratio of water vapor to argon was 3. Power of 500 W and 700 W was input to the cobalt metal target and the tin metal target, respectively.

The resulting layer is a mixture of an oxidative coloring electrochromic material, comprising cobalt oxide and cobalt hydroxide, with a metal oxide which is tin oxide. The layer also contains cobalt metal, etc.

On the mixture layer, tantalum pentoxide was vacuum-evaporated at a substrate temperature of 300° C. and at an $O_2$ partial pressure of $3 \times 10^{-2}$ Pa, thereby a transparent ion conductive layer 300 nm thick was formed as the fourth layer.

Then, tungsten trioxide was vacuum-evaporated on the transparent ion conductive layer at a substrate temperature of 300° C. and at an $O_2$ partial pressure of $5 \times 10^{-2}$ Pa, thereby a reductive coloring electrochromic layer 1,000 nm thick was formed as the fifth layer.

Finally, ITO was deposited on the reductive coloring electrochromic layer by radio-frequency ion plating at a substrate temperature of 300° C. and at an $O_2$ partial pressure of $5 \times 10^{-2}$ Pa, using the radio-frequency power of 150 W; thereby a transparent conductive layer 450 nm thick was formed as the sixth layer.

According to the above mentioned manner, an EC device with 6 layers shown in FIG. 2 could be obtained. The resulting EC device was resin-encapsulated as shown in FIG. 5.

The response speed of the EC device was evaluated as follows: The EC device was discolored (became approximately transparent) by applying a voltage, then another voltage was applied thereto in the reverse direction; and the time-duration from the second voltage application to the time when the contrast ratio reached 10 or more was measured as the response speed. The repeated durability was evaluated as follows: A voltage of +−2 V was repeatedly applied between the transparent electrode layers; the number of times required for 10% decrease in the optical transmittance and the number of times required for 50% decrease in the response speed were measured; and the smaller number was used for the evaluation of the repeated durability. These evaluation methods were applied in common to the following examples and comparative examples.

From the measurements, the response speed was determined to be 100 ms when a contrast ratio, during discoloring/during coloring, of the mean optical transmittance was 10 or more in a wavelength range of 400 nm to 700 nm. The optical transmittance during discoloring was 78%, and the repeated durability was five hundred thousand times. Moreover, excellent reproducibility of the EC devices was achieved by repeating similar production.

Example 2

An EC device was prepared by a way similar to example 1 except that the following modification was added. The composition ratio of cobalt to tin (Co/Sn) in the third layer was decreased gradually towards the fourth layer by controlling the power input to the cobalt metal target and the tin metal target. Practically, the power input to the cobalt metal target was changed from 600 w to 200 W according to the deposition process while the power input to the tin metal target was maintained at 700 W. The EC device was resin-encapsulated, and then, subjected to the same evaluation as example 1.

As a result, the response speed was 80 ms, the optical transmittance during discoloring was 80%, and the repeated durability was five hundred thousand times.

Example 3

An EC device was prepared by a way similar to example 1 except that the following modification was added. For depositing the third layer, a tantalum metal target was employed instead of the tin metal target. The power input to the cobalt metal target and tantalum metal target was 500 W and 700 W respectively. The EC device was resin-encapsulated, and then, subjected to the same evaluation as example 1.

As a result, the response speed was 90 ms, the optical transmittance during discoloring was 82%, and the repeated durability was four hundred thousand times.

Example 4

An EC device was prepared by a way similar to example 1 except that the following modification was added. For depositing the third layer, a nickel metal target was employed instead of the cobalt metal target. The power input to the nickel metal target and tin metal target was 500 W and 700 W, respectively. The EC device of this example was formed in a shape similar to that shown in FIG. 1. After being resin-encapsulated, the EC device was subjected to the same evaluation as example 1.

As a result, the response speed was 150 ms, the optical transmittance during discoloring was 76%, and the repeated durability was four hundred thousand times.

Example 5

An EC device was prepared by a way similar to example 1 except that the following modification was added. For depositing the second layer, an iridium metal target was employed instead of the cobalt metal target. The power input to the iridium metal target was 150 W. The EC device was resin-encapsulated, and then, subjected to the same evaluation as example 1.

As a result, the response speed was 50 ms, the optical transmittance during discoloring was 76%, and the repeated durability was seven hundred thousand times.

Example 6

An EC device was prepared by a way similar to example 1 except that the following modification was added. The fifth layer was formed from a mixture of tungsten trioxide and molybdenum trioxide at a weight ratio of 9:1 instead of tungsten trioxide alone. The EC device was resin-encapsulated, and then, subjected to the same evaluation as example 1.

As a result, the response speed was 120 ms, the optical transmittance during discoloring was 78%, and the repeated durability was four hundred fifty thousand times. Since the fifth layer contained molybdenum trioxide, the resulting EC device could display white and black.

Example 7

An EC device was prepared by a way similar to example 1 except that the second and third layers were deposited in an atmosphere of oxygen. The EC device was resin-encapsulated, and then, subjected to the same evaluation as example 1.

As a result, the response speed was 250 ms, the optical transmittance during discoloring was 70%, and the repeated durability was four hundred thousand times.

Comparative example 1

An EC device was prepared by a way similar to example 1 except that the third layer was not formed. The EC device was resin-encapsulated, and then, subjected to the same evaluation as example 1.

As a result, the response speed was 400 ms, the optical transmittance during discoloring was 80%, and the repeated durability was ten thousand times.

Comparative example 2

An EC device was prepared by a way similar to example 1 except that the second layer was not formed. The EC device was resin-encapsulated, and then, subjected to the same evaluation as example 1.

As a result, the response speed was 700 ms, the optical transmittance during discoloring was 82%, and the repeated durability was five thousand times.

Example 8

An EC device was prepared by a way similar to example 1 except that the following modification was added. The second and third layers were deposited in an atmosphere of a mixture of water vapor and argon at a mixture pressure of 0.8 Pa. The EC device was resin-encapsulated, and then, subjected to the same evaluation as example 1.

As a result, the response speed was 90 ms, the optical transmittance during discoloring was 60%, and the repeated durability was five hundred thousand times.

Example 9

An EC device was prepared by a way similar to example 1 except that the following modification was added. The second and third layers were deposited in an atmosphere of a mixture of water vapor and argon at a mixture pressure of 25 Pa. The EC device was resin-encapsulated, and then, subjected to the same evaluation as example 1.

As a result, the response speed was 100 ms, the optical transmittance during discoloring was 78%, and the repeated durability was five hundred eighty thousand times. The time period required for the deposition of the second and third layers became 12 times longer compared with embodiment 1.

Example 10

On a transparent glass substrate, ITO was vacuum-evaporated at a substrate temperature of 300° C. and at an $O_2$ partial pressure of $5 \times 10^{-2}$ Pa, thereby a transparent conductive layer 150 nm thick was formed as the first layer.

Then, deposition on the transparent conductive layer proceeded by radio-frequency sputtering using iridium metal as a target under conditions such that the substrate was at room temperature and the $O_2$ partial pressure was 1 Pa; thereby an oxidative coloring electrochromic layer 5 nm thick was formed as the second layer. Power of 130 W was input to the iridium metal target.

The oxidative coloring electrochromic layer mainly contains iridium oxide and iridium hydroxide, and also contains iridium metal, etc.

As the third layer, a mixture layer 25 nm thick comprising an oxidative coloring electrochromic material and a metal oxide was deposited on the oxidative coloring electrochromic layer by radio-frequency co-sputtering using iridium metal and tin metal as targets under conditions such that the substrate was at room temperature and the pressure of water vapor was 1 Pa. Power of 130 W and 700 W was input to the iridium metal target and the tin metal target, respectively.

The resulting layer is a mixture of an oxidative coloring electrochromic material, comprising iridium oxide and iridium hydroxide, with a metal oxide which is tin oxide. The layer also contains iridium metal, etc.

On the mixture layer, tantalum pentoxide was vacuum-evaporated at a substrate temperature of 300° C. and at an $O_2$ partial pressure of $3 \times 10^{-2}$ Pa, thereby a transparent ion conductive layer 300 nm thick was formed as the fourth layer.

Then, tungsten trioxide was vacuum-evaporated on the transparent ion conductive layer at a substrate temperature of 300° C. and at an $O_2$ partial pressure of $5 \times 10^{-2}$ Pa, thereby a reductive coloring electrochromic layer 1,000 nm thick was formed as the fifth layer.

Finally, ITO was deposited on the reductive coloring electrochromic layer by radio-frequency ion plating at a substrate temperature of 300° C. and at an $O_2$ partial pressure of $5 \times 10^{-2}$ Pa, using the radio-frequency power of 150 W; thereby a transparent conductive layer 300 nm thick was formed as the sixth layer.

According to the above mentioned manner, an EC device with 6 layers shown in FIG. 2 could be obtained. The resulting EC device was resin-encapsulated as shown in FIG. 5.

From the measurement performed by applying a voltage of +−2 V between the transparent conductive layers, the response speed was determined to be 23 ms when a contrast ratio, during discoloring/during coloring, of the mean optical transmittance was 10 or more in a wavelength range of 400 nm to 700 nm. The optical transmittance during discoloring was 77%, and the repeated durability was eight hundred thousand times.

Example 11

An EC device was prepared by a way similar to example 10 except that the following modification was added. The third layer was deposited by radio-frequency sputtering instead of radio-frequency co-sputtering and an iridium metal chip was placed on the tin target during sputtering. The EC device was resin-encapsulated, and then, subjected to the same evaluation as example 10.

As a result, the response speed was 25 ms, the optical transmittance during discoloring was 75%, and the repeated durability was eight hundred thousand times.

Comparative example 3

An EC device was prepared by a way similar to example 10 except that the third layer was not formed. The EC device was resin-encapsulated, and then, subjected to the same evaluation as example 10.

As a result, the response speed was 120 ms, the optical transmittance during discoloring was 78%, and the repeated durability was twenty thousand times.

Comparative example 4

An EC device was prepared by a way similar to example 10 except that the second layer was not formed and the third layer was deposited in an atmosphere of oxygen at an $O_2$ partial pressure of 1 Pa. The EC device was resin-encapsulated, and then, subjected to the same evaluation as example 10.

As a result, the response speed was 150 ms, the optical transmittance during discoloring was 70%, and the repeated durability was ten thousand times.

Example 12

On a transparent glass substrate, ITO was vacuum-evaporated at a substrate temperature of 300° C. and at an $O_2$ partial pressure of $5 \times 10^{-2}$ Pa, thereby a transparent conductive layer 150 nm thick was formed as the first layer.

Then, deposition on the transparent conductive layer proceeded by radio-frequency sputtering using iridium metal as a target under conditions such that the substrate was at room temperature and the $O_2$ partial pressure was 1 Pa; thereby an oxidative coloring electrochromic layer 5 nm thick was formed as the second layer. Power of 130 W was input to the iridium metal target.

The oxidative coloring electrochromic layer mainly contains iridium oxide and iridium hydroxide, and also contains iridium metal, etc.

As the third layer, a mixture layer 400 nm thick comprising an oxidative coloring electrochromic material and a metal oxide was deposited on the oxidative coloring electrochromic layer by radio-frequency co-sputtering using iridium metal and tin metal as targets under conditions such that the substrate was at room temperature, the mixture pressure of water vapor and argon was 5 Pa, and the flow ratio of water vapor to argon was 3. Power of 130 W and 700 W was input to the iridium metal target and the tin metal target, respectively.

The resulting layer is a mixture of an oxidative coloring electrochromic material, comprising iridium oxide and iridium hydroxide, with a metal oxide which is tin oxide. The layer also contains iridium metal, etc.

On the mixture layer, tantalum pentoxide was vacuum-evaporated at a substrate temperature of 300° C. and at an $O_2$ partial pressure of $3 \times 10^{-2}$ Pa, thereby a transparent ion conductive layer 300 nm thick was formed as the fourth layer.

Then, tungsten trioxide was vacuum-evaporated on the transparent ion conductive layer at a substrate temperature of 300° C. and at an $O_2$ partial pressure of $5 \times 10^{-2}$ Pa, thereby a reductive coloring electrochromic layer 1,000 nm thick was formed as the fifth layer.

Finally, ITO was deposited on the reductive coloring electrochromic layer by radio-frequency ion plating at a substrate temperature of 300° C. and at an $O_2$ partial pressure of $5 \times 10^{-2}$ Pa, using the radio-frequency power of 150 W; thereby a transparent conductive layer 300 nm thick was formed as the sixth layer.

According to the above mentioned manner, an EC device with 6 layers shown in FIG. 2 could be obtained. The resulting EC device was resin-encapsulated as shown in FIG. 5.

From the measurement performed by applying a voltage of +−2 V between the transparent conductive layers, the response speed was determined to be 10 ms when a contrast ratio, during discoloring/during coloring, of the mean optical transmittance was 10 or more in a wavelength range of 400 nm to 700 nm. The optical transmittance during discoloring was 80%, and the repeated durability was more than one million times.

Example 13

An EC device was prepared by a way similar to example 12 except that the following modification was added. The composition ratio of iridium to tin (Ir/Sn) in the third layer was decreased gradually towards the fourth layer by controlling the power input to the iridium metal target and the tin metal target. Practically, the power input to the iridium metal target was changed from 150 W to 100 W according to the deposition process while the power input to the tin metal target was maintained at 700 W. The EC device was resin-encapsulated, and then, subjected to the same evaluation as example 12.

As a result, the response speed was 8 ms, the optical transmittance during discoloring was 82%, and the repeated durability was more than one million times.

Example 14

An EC device was prepared by a way similar to example 12 except that the following modification was added. The third layer was deposited by radio-frequency sputtering instead of radio-frequency co-sputtering and an iridium metal chip was placed on the tin target during sputtering. The EC device was resin-encapsulated, and then, subjected to the same evaluation as example 12.

As a result, the response speed was 12 ms, the optical transmittance during discoloring was 80%, and the repeated durability was more than one million times.

Example 15

An EC device was prepared by a way similar to example 12 except that the third layer was deposited in an atmosphere of oxygen at an $O_2$ partial pressure of 1 Pa. The EC device was resin-encapsulated, and then, subjected to the same evaluation as example 12.

As a result, the response speed was 50 ms, the optical transmittance during discoloring was 74%, and the repeated durability was seven hundred thousand times.

Example 16

On a transparent glass substrate, ITO was vacuum-evaporated at a substrate temperature of 300° C. and at an $O_2$ partial pressure of $5 \times 10^{-2}$ Pa, thereby a transparent conductive layer 150 nm thick was formed as the first layer.

Then, deposition on the transparent conductive layer proceeded by radio-frequency sputtering using iridium metal as a target under conditions such that the substrate was at room temperature and the $O_2$ partial pressure was 1 Pa; thereby an oxidative coloring electrochromic layer 5 nm thick was formed as the second layer. Power of 130 W was input to the iridium metal target.

The oxidative coloring electrochromic layer mainly contains iridium oxide and iridium hydroxide, and also contains iridium metal, etc.

As the third layer, an alternate layer alternating at least one oxidative coloring electrochromic sublayer 0.1 nm thick and at least one metal oxide sublayer 0.5 nm thick was formed on the oxidative coloring electrochromic layer by radio-frequency sputtering using iridium metal and tin metal as targets under conditions such that the substrate was at room temperature, and the $O_2$ partial pressure was 1 Pa. Power of 130 W and 700 W was input to the iridium metal target and the tin metal target, respectively. The iridium metal target and tin metal target were provided with corresponding shutters which were arranged to alternately open or close so as to determined the thickness of each sublayer.

The resulting alternate layer has a laminated structure of 500 pairs of the oxidative coloring electrochromic sublayer comprising iridium oxide and iridium hydroxide and the metal oxide sublayer comprising tin oxide. The oxidative coloring electrochromic sublayers also contain metal iridium, etc.

On the alternate layer, tantalum pentoxide was vacuum-evaporated at a substrate temperature of 300° C. and at an $O_2$ partial pressure of $3 \times 10^{-2}$ Pa, thereby a transparent ion conductive layer 300 nm thick was formed as the fourth layer.

Then, tungsten trioxide was vacuum-evaporated on the transparent ion conductive layer at a substrate temperature of 300° C. and at an $O_2$ partial pressure of $5 \times 10^{-2}$ Pa, thereby a reductive coloring electrochromic layer 1,000 nm thick was formed as the fifth layer.

Finally, ITO was deposited on the reductive coloring electrochromic layer by radio-frequency ion plating at a substrate temperature of 300° C. and at an $O_2$ partial pressure of $5 \times 10^{-2}$ Pa, using the radio-frequency power of 150 W; thereby a transparent conductive layer 300 nm thick was formed as the sixth layer.

According to the above mentioned manner, an EC device with 6 layers shown in FIG. 3 could be obtained and was resin-encapsulated.

From the measurement performed by applying a voltage of +−2 V between the transparent conductive layers, the response speed was determined to be 40 ms when a contrast ratio, during discoloring/during coloring, of the mean optical transmittance was 10 or more in a wavelength range of 400 nm to 700 nm. The optical transmittance during discoloring was 72%, and the repeated durability was seven hundred fifty thousand times.

Example 17

An EC device was prepared by a way similar to example 16 except that the following modification was added. The third layer was deposited in an atmosphere of a mixture of oxygen and water vapor at a ratio of 1:1. The EC device was resin-encapsulated, and then, subjected to the same evaluation as example 16.

As a result, the response speed was 25 ms, the optical transmittance during discoloring was 75%, and the repeated durability was seven hundred fifty thousand times.

Example 18

An EC device was prepared by a way similar to example 16 except that the following modification was added. The third layer was deposited in an atmosphere of a mixture of water vapor and argon at a mixture pressure of 5 Pa and at the flow ratio (water vapor/argon) of 3. Besides having the alternate layer 31 instead of the mixture layer 11, the EC device used for this example was similar to that shown in FIG. 2, rather than that shown in FIG. 3. The EC device was resin-encapsulated, and then, subjected to the same evaluation as example 16.

As a result, the response speed was 10 ms, the optical transmittance during discoloring was 82%, and the repeated durability was more than one million times.

The invention may be embodied in other specific forms without departing from the spirit or essential characteristics thereof. The present embodiments and examples are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. An electrochromic device at least comprising;
a pair of opposed transparent electrodes, an oxidative coloring electrochromic layer, a layer comprising an oxidative coloring electrochromic material and a metal oxide, said layer being formed from a mixture of said oxidative coloring electrochromic material and said metal oxide, a transparent ion conductive layer, and a reductive coloring electrochromic layer, said layers being provided between said pair of opposed transparent electrodes.

2. An electrochromic device at least comprising;
a pair of opposed transparent electrodes, an oxidative coloring electrochromic layer, a layer comprising an oxidative coloring electrochromic material and a metal oxide, said layer being formed from a mixture of said oxidative coloring electrochromic material and said metal oxide, a transparent ion conductive layer, and a reductive coloring electrochromic layer,
wherein said oxidative coloring electrochromic layer, said layer comprising an oxidative coloring electrochromic material and a metal oxide, said transparent ion conductive layer, and said reductive coloring electrochromic layer are successively provided one over the other between said pair of opposed transparent electrodes.

3. An electrochromic device as set forth in one of claims 1 or 2, wherein said metal oxide is at least one selected from the group consisting of $TiO_2$, $Ta_2O_5$, $ZrO_2$, $HfO_2$, $Y_2O_3$, $Al_2O_3$, $SiO_2$, and $SnO_2$, and said oxidative coloring electrochromic material contains at least one element selected from the group consisting of Co, Ni, Fe, Ir, Cu, Ru, Rh, Pd, Re, Os, Pt, Ho, Sm, Cr, Dy, and Er, which element exists as a simple body, a metal oxide, a hydroxide, an oxyhydroxide, or a mixture thereof.

4. An electrochromic device as set forth in claim 3, wherein said oxidative coloring electrochromic material comprises at least one selected from the group consisting of iridium, iridium oxide, iridium hydroxide, iridium oxyhydroxide, cobalt, cobalt oxide, cobalt hydroxide, cobalt oxyhydroxide, nickel, nickel oxide, nickel hydroxide, and nickel oxyhydroxide.

5. An electrochromic device as set forth in one of claims 1 or 2, wherein said oxidative coloring electrochromic material comprises H, O, and at least one kind of atoms selected from the group consisting of Co, Ni, Fe, Ir, Cu, Ru, Rh, Pd, Re, Os, Pt, Ho, Sm, Cr, Dy, and Er.

6. An electrochromic device as set forth in claim 5, wherein said oxidative coloring electrochromic material comprises H, O, and at least one kind of atoms selected from the group consisting of Co, Ni, and Ir.

7. An electrochromic device as set forth in one of claims 1 or 2, comprising a transparent substrate adjacent to at least one outer surface of said pair of transparent electrodes.

8. An electrochromic device as set forth in claim 7, wherein said transparent substrate is provided with an antireflection coating comprising a dielectric material on a surface reverse to said transparent electrodes.

9. An electrochromic device as set forth in claim 8, wherein said dielectric material comprises at least one selected from the group consisting of $Al_2O_3$, $TiO_2$, and $MgF_2$.

10. An electrochromic device as set forth in one of claims 1 or 3, wherein said transparent electrodes comprise indium tin oxide.

11. An electrochromic device as set forth in one of claims 1 or 2, wherein said oxidative coloring electrochromic layer comprises at least one element selected from the group consisting of Co, Ni, Fe, Ir, Cu, Ru, Rh, Pd, Re, Os, Pt, Ho, Sm, Cr, Dy, and Er, which element exists as a simple body, an oxide, a hydroxide, an oxyhydroxide, or a mixture thereof.

12. An electrochromic device as set forth in claim 11, wherein said oxidative coloring electrochromic layer comprises at least one selected from the group consisting of iridium, iridium oxide, iridium hydroxide, iridium oxyhydroxide, cobalt, cobalt oxide, cobalt hydroxide, cobalt oxyhydroxide, nickel, nickel oxide, nickel hydroxide, and nickel oxyhydroxide.

13. An electrochromic device as set forth in one of claims 1 or 2, wherein said oxidative coloring electrochromic layer comprises H, O, and at least one kind of atoms selected from the group consisting of Co, Ni, Fe, Ir, Cu, Ru, Rh, Pd, Re, Os, Pt, Ho, Sm, Cr, Dy, and Er.

14. An electrochromic device as set forth in claim 13, wherein said oxidative coloring electrochromic layer comprises H, O, and at least one kind of atoms selected from the group consisting of Co, Ni, and Ir.

15. An electrochromic device as set forth in one of claims 1 or 2, wherein the thickness of said oxidative coloring electrochromic layer is from 1 nm to 50 nm both inclusive.

16. An electrochromic device as set forth in claims 1 or 2, wherein the thickness of said layer comprising an oxidative coloring electrochromic material and a metal oxide is from 10 nm to 5,000 nm both inclusive.

17. An electrochromic device as set forth in claims 1 or 2, wherein the weight ratio of said oxidative coloring electrochromic material to said metal oxide (oxidative coloring electrochromic material/metal oxide) is from 0.02 to 1 both inclusive.

18. An electrochromic device as set forth in claim 2, wherein, in said layer comprising an oxidative coloring electrochromic material and a metal oxide, the composition ratio of said oxidative coloring electrochromic material to said metal oxide (oxidative coloring electrochromic material/metal oxide) decreases gradually towards said transparent ion conductive layer.

19. An electrochromic device as set forth in one of claims 1 or 2, wherein said transparent ion conductive layer comprises at least one selected from the group consisting of $Ta_2O_5$, $ZrO_2$, $SiO_2$, and $MgF_2$.

20. An electrochromic device as set forth in claim 19, wherein said transparent ion conductive layer comprises $Ta_2O_5$.

21. An electrochromic device as set forth in one of claims 1 or 2, wherein said reductive coloring electrochromic layer comprises at least one selected from the group consisting of $WO_3$, $MoO_3$, and $Nb_2O_5$.

22. An electrochromic device as set forth in claim 21, wherein said reductive coloring electrochromic layer comprises $WO_3$.

23. An electrochromic device as set forth in claim 21, wherein said reductive coloring electrochromic layer comprises a mixture of $WO_3$ and $MoO_3$.

24. An electrochromic device at least comprising;
a pair of opposed transparent substrates provided with a pair of opposed transparent electrodes therebetween; and an oxidative coloring electrochromic layer, a layer comprising an oxidative coloring electrochromic material and a metal oxide, said layer being formed from a mixture of said oxidative coloring electrochromic material and said metal oxide, a transparent ion conductive layer, and a reductive coloring electrochromic layer provided between said pair of transparent electrodes, wherein at least said oxidative coloring electrochromic layer, said layer comprising an oxidative coloring electrochromic material and a metal oxide, said transparent ion conductive layer, and said reductive coloring electrochromic layer are encapsulated by a resin.

25. An electrochromic device at least comprising;

a pair of opposed transparent substrates provided with a pair of opposed transparent electrodes therebetween; and an oxidative coloring electrochromic layer, a layer comprising an oxidative coloring electrochromic material and a metal oxide, said layer being formed from a mixture of said oxidative coloring electrochromic material and said metal oxide, a transparent ion conductive layer, and a reductive coloring electrochromic layer provided between said pair of transparent electrodes, wherein said oxidative coloring electrochromic layer, said layer comprising an oxidative coloring electrochromic material and a metal oxide, said transparent ion conductive layer, and said reductive coloring electrochromic layer are successively provided one over the other between said pair of opposed transparent electrodes; and at least said oxidative coloring electrochromic layer, said layer comprising an oxidative coloring electrochromic material and a metal oxide, said transparent ion conductive layer, and said reductive coloring electrochromic layer are encapsulated by a resin.

26. An electrochromic device-as set forth in one of claims 24 or 25, wherein said metal oxide is at least one selected from the group consisting of $TiO_2$, $Ta_2O_5$, $ZrO_2$, $HfO_2$, $Y_2O_3$, $Al_2O_3$, $SiO_2$, and $SnO_2$, and said oxidative coloring electrochromic material contains at least one element selected from the group consisting of Co, Ni, Fe, Ir, Cu, Ru, Rh, Pd, Re, Os, Pt, Ho, Sm, Cr, Dy, and Er, which element exists as a simple body, an oxide, a hydroxide, an oxyhydroxide, or a mixture thereof.

27. An electrochromic device as set forth in claim 26, wherein said oxidative coloring electrochromic material comprises at least one selected from the group consisting of iridium, iridium oxide, iridium hydroxide, iridium oxyhydroxide, cobalt, cobalt oxide, cobalt hydroxide, cobalt oxyhydroxide, nickel, nickel oxide, nickel hydroxide, nickel oxyhydroxide, and mixtures thereof.

28. An electrochromic device as set forth in one of claims 24 or 25, wherein aid oxidative coloring electrochromic material comprises H, O, and at least one kind of atoms selected from the group consisting of Co, Ni, Fe, Ir, Cu, Ru, Rh, Pd, Re, Os, Pt, Ho, Sm, Cr, Dy, and Er.

29. An electrochromic device as set forth in claim 28, wherein said oxidative coloring electrochromic material comprises H, O, and at least one kind of atoms selected from the group consisting of Co, Ni, and Ir.

30. An electrochromic device as set forth in one of claims 24 or 25, wherein at least one of said pair of transparent substrates is provided with an anti-reflection coating comprising a dielectric material on an outer surface.

31. An electrochromic device as set forth in claim 30, wherein said dielectric material comprises at least one selected from the group consisting of $Al_2O_3$, $TiO_2$, and $MgF_2$.

32. An electrochromic device as set forth in one of claims 24 or 25, wherein said transparent electrodes comprise indium tin oxide.

33. An electrochromic device as set forth in one of claims 24 or 25, wherein said oxidative coloring electrochromic layer comprises at least one element selected from the group consisting of Co, Ni, Fe, Ir, Cu, Ru, Rh, Pd, Re, Os, Pt, Ho, Sm, Cr, Dy, and Er, which element exists as a simple body, an oxide, a hydroxide, an oxyhydroxide, or a mixture thereof.

34. An electrochromic device as set forth in claim 33, wherein said oxidative coloring electrochromic layer comprises at least one selected from the group consisting of iridium, iridium oxide, iridium hydroxide, iridium oxyhydroxide, cobalt, cobalt oxide, cobalt hydroxide, cobalt oxyhydroxide, nickel, nickel oxide, nickel hydroxide, and nickel oxyhydroxide.

35. An electrochromic device as set forth in one of claims 24 or 25, wherein said oxidative coloring electrochromic layer comprises H, O, and at least one kind of atoms selected from the group consisting of Co, Ni, Fe, Ir, Cu, Ru, Rh, Pd, Re, Os, Pt, Ho, Sm, Cr, Dy, and Er.

36. An electrochromic device as set forth in claim 35, wherein said oxidative coloring electrochromic layer comprises H, O, and at least one kind of atoms selected from the group consisting of Co, Ni, and Ir.

37. An electrochromic device as set forth in one of claims 24 or 25, wherein the thickness of said oxidative coloring electrochromic layer is from 1 nm to 50 nm both inclusive.

38. An electrochromic device as set forth in claims 24 or 25, wherein the thickness of said layer comprising an oxidative coloring electrochromic material and a metal oxide is from 10 nm to 5,000 nm both inclusive.

39. An electrochromic device as set forth in claims 24 or 25, wherein the weight ratio of said oxidative coloring electrochromic material to said metal oxide (oxidative coloring electrochromic material/metal oxide) is from 0.02 to 1 both inclusive.

40. An electrochromic device as set forth in claim 25, wherein, in said layer comprising an oxidative coloring electrochromic material and a metal oxide, the composition ratio of said oxidative coloring electrochromic material to said metal oxide (oxidative coloring electrochromic material/metal oxide) decreases gradually towards said transparent ion conductive layer.

41. An electrochromic device as set forth in one of claims 24 or 25, wherein said transparent ion conductive layer comprises at least one selected from the group consisting of $Ta_2O_5$, $ZrO_2$, $SiO_2$, and $MgF_2$.

42. An electrochromic device as set forth in claim 41, wherein said transparent ion conductive layer comprises $Ta_2O_5$.

43. An electrochromic device as set forth in one of claims 24 or 25, wherein said reductive coloring electrochromic layer comprises at least one selected from the group consisting of $WO_3$, $MoO_3$, and $Nb_2O_5$.

44. An electrochromic device as set forth in claim 43, wherein said reductive coloring electrochromic layer comprises $WO_3$.

45. An electrochromic device as set forth in claim 43, wherein said reductive coloring electrochromic layer comprises a mixture of $WO_3$ and $MoO_3$.

46. An electrochromic device as set forth in one of claims 24 or 25, wherein said pair of transparent electrodes respectively have portions for connecting and said transparent electrodes are encapsulated by said resin except said portions for connecting.

* * * * *

UNITED STATES PATENT AND TRADEMARK OFFICE
CERTIFICATE OF CORRECTION

PATENT NO. : 5,831,760

DATED : November 3, 1998

INVENTOR(S) : SHIGERU HASHIMOTO, ET AL.

It is certified that error appears in the above-identified patent and that said Letters Patent is hereby corrected as shown below:

COLUMN 5

Line 12, "elecrochromizm" should read --electrochromism--.

COLUMN 7

Line 19, "a" should read --an--.

Line 24, "determined" should read --determine--.

COLUMN 15

Line 8, "comprising;" should read --comprising:--.

Line 18, "comprising;" should read --comprising:--.

COLUMN 16

Line 2, "1 or 3," should read --1 or 2,--.

Line 62, "comprising;" should read --comprising:--.

UNITED STATES PATENT AND TRADEMARK OFFICE
CERTIFICATE OF CORRECTION

PATENT NO. : 5,831,760

DATED : November 3, 1998

INVENTOR(S) : SHIGERU HASHIMOTO, ET AL.

It is certified that error appears in the above-identified patent and that said Letters Patent is hereby corrected as shown below:

COLUMN 17

Line 12, "comprising;" should read --comprising:--.

Line 36, "device-as" should read --device as--.

Signed and Sealed this

Thirteenth Day of July, 1999

Attest:

Attesting Officer

Q. TODD DICKINSON

Acting Commissioner of Patents and Trademarks